(12) United States Patent
Ojima et al.

(10) Patent No.: US 7,612,310 B2
(45) Date of Patent: Nov. 3, 2009

(54) MANUFACTURING METHOD OF A MOLDED GEAR

(75) Inventors: Masaaki Ojima, Kawaguchi (JP); Yasutoshi Yoshida, Kawaguchi (JP)

(73) Assignee: Enplas Corporation, Saitama-Ken (JP)

(*) Notice: Subject to any disclaimer, the term of this patent is extended or adjusted under 35 U.S.C. 154(b) by 585 days.

(21) Appl. No.: 11/386,823

(22) Filed: Mar. 23, 2006

(65) Prior Publication Data
US 2006/0261517 A1 Nov. 23, 2006

(30) Foreign Application Priority Data
Mar. 23, 2005 (JP) ............................. 2005-084404

(51) Int. Cl.
B23H 1/00 (2006.01)
B23H 9/00 (2006.01)
(52) U.S. Cl. .................................................. 219/69.17
(58) Field of Classification Search ............. 219/69.15, 219/69.17, 69.2; 74/459.5, 457; 76/101.1, 76/107.1
See application file for complete search history.

(56) References Cited

U.S. PATENT DOCUMENTS

| | | | | |
|---|---|---|---|---|
| 3,498,158 A | * | 3/1970 | Kougel | ............ 219/69.17 |
| 5,539,172 A | * | 7/1996 | Takase et al. | ............ 219/69.2 |
| 6,204,466 B1 | * | 3/2001 | Tabor | ............ 219/69.17 |
| 6,324,931 B1 | * | 12/2001 | Tsung | ............ 74/459.5 |
| 6,335,503 B1 | * | 1/2002 | Tsung | ............ 219/69.17 |
| 6,732,605 B2 | * | 5/2004 | Takano et al. | ............ 74/459.5 |

FOREIGN PATENT DOCUMENTS

| | | | |
|---|---|---|---|
| JP | 9-323219 A | * | 12/1997 |
| JP | 10094921 | | 4/1998 |
| JP | 2000-158449 A | * | 6/2000 |
| JP | 2003-90413 A | * | 3/2003 |

* cited by examiner

Primary Examiner—Geoffrey S Evans
(74) Attorney, Agent, or Firm—Baker & Hostetler LLP

(57) ABSTRACT

A gear piece having a hollow portion of the same shape as a molded gear is formed by performing electrical discharge-machining with respect to a metal member that is smaller in thickness than a tooth width dimension of the molded gear, using a first discharging electrode; a chamfer-application piece having a recess portion of the same shape as the chamfered portions of the molded gear is formed by performing electrical discharge-machining by only a predetermined depth with respect to other metal member, using a second discharging electrode; a molding die is assembled by according the hollow portion of the gear piece with the recess portion of the chamfer-application piece; and the molded gear is manufactured by forming a gear member using the molding die.

7 Claims, 9 Drawing Sheets

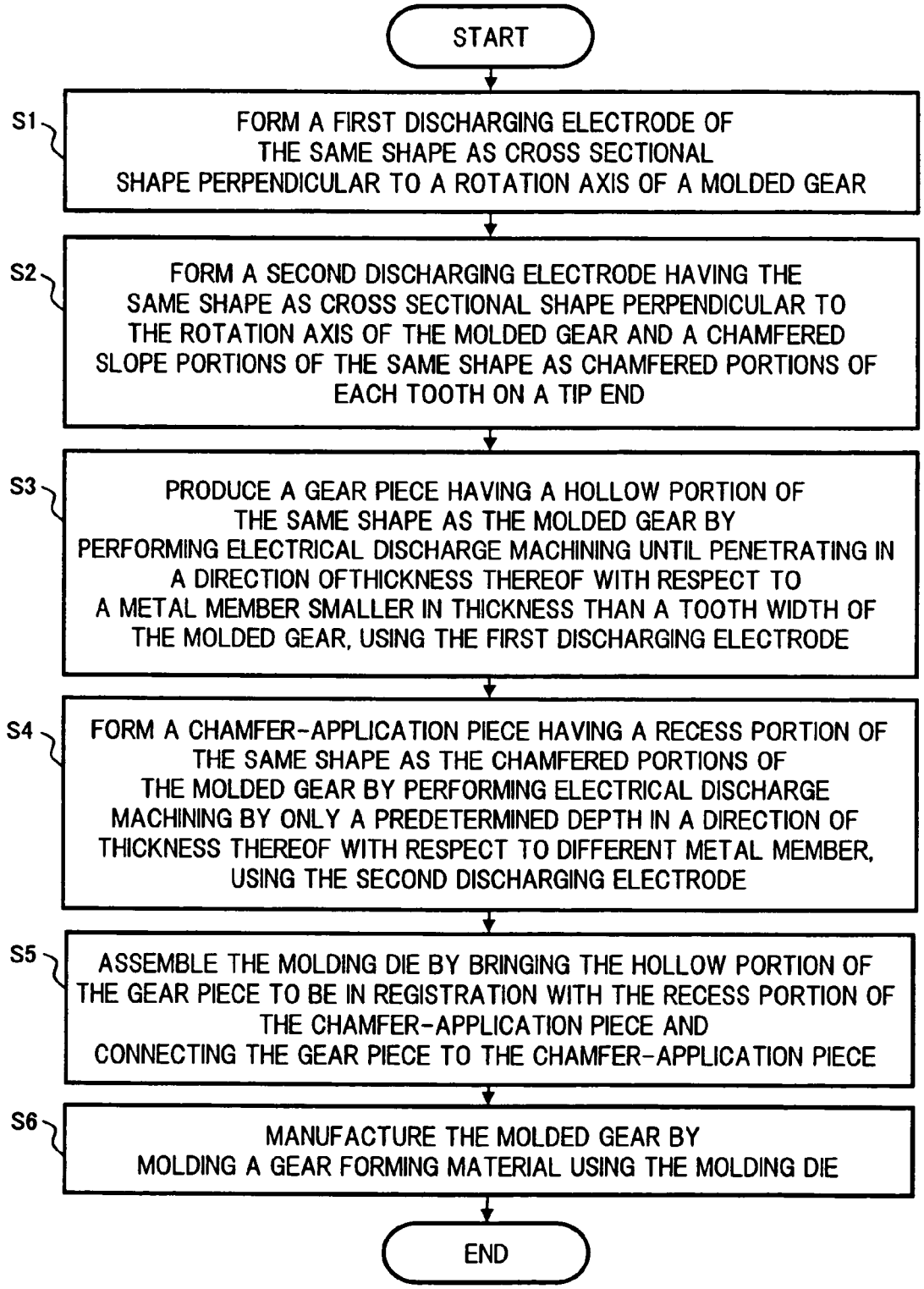

CROSS SECTION TAKEN ALONG LINE X-X

CROSS SECTION TAKEN ALONG LINE Y-Y

MANUFACTURING METHOD OF A MOLDED GEAR

BACKGROUND OF THE INVENTION

1. Field of the Invention

The present invention relates to a manufacturing method adapted for use in manufacturing a molded gear having chamfered portions which are formed with slopes provided on one end edge of each of a plurality of teeth. More particularly, the present invention relates to a manufacturing method of a molded gear which makes it possible to produce a highly accurate molding die by separately forming a gear piece corresponding to tooth width portions of the molded gear and a chamfer-application piece corresponding to chamfered portions; and which intends to accurately manufacture the molded gear in which the chamfered portions are provided on an end of each of the tooth, by using the molding die.

2. Description of the Related Art

Heretofore, a manufacturing method of a toothed gear having chamfered portions formed in each tooth end, has been generally performed by cutting with a cutting tool such as an end mill, which is attached to rotate while chamfering the edge of each tooth end of a gear member that is fixedly mounted on a work table of a machine tool (for example, refer to Japanese Unexamined Patent Publication No. 10-94921). Such manufacturing method with machining is effective in the case where the gear member is made of metal. However, in a case where the gear member is resin such as plastic, it is difficult to obtain good machining accuracy because the gear member is soft and it is likely to be high cost because of a number of machining steps included.

Consequently, in the case where the gear member is a soft member such as resin, the gear provided with chamfered portions on a tooth end is manufactured by performing injection-molding of resin, using a molding die previously provided with slope portions in response to one end of the gear teeth. For example, a manufacturing method of a molded gear, in which a plurality of teeth 1 as shown in FIG. 7 are provided and chamfered portions 2 are formed with slopes provided on one end edges of each of the teeth 1, forms first an electric discharging electrode member 3 having tooth profile portions 4 which has the same shape as cross-sectional shape perpendicular to a rotation axis of the molded gear and which has the same shape as a tooth profile of the tooth 1 shown in FIG. 7 on the circumferential surface thereof, as sown in FIG. 8A (a first step). Next, as shown in FIG. 8B, a discharging electrode 6 having chamfered slope portions 5 of the same shape as the chamfered portions 2 of the tooth 1 of the molded gear is formed by cutting tip ends of the respective end edges of the tooth profile portion 4 of the discharging electrode member 3 that was produced at the first step, by the use of a cutting tool such as an end mil (a second step). Further, by the use of the discharging electrode 6 formed at the second step, a molding die 8 as shown in FIG. 9, is formed in a metal member 7 having a thickness larger than the dimension of the tooth width of the gear to be molded by conducting the electrical discharge-machining (i.e., an electrical discharge-machining of a bottomed recess), so that machining is proceeded into the metal member 7 by a predetermined depth in a direction of an arrow A shown in the same FIG. 9 (a third step). At this time, a machined recess portion 10 having grooves 9 along the inner circumferential surface thereof coincident with the tooth profile portions 4 of the discharging electrode 6 is formed in the metal member 7, the recess portion 10 being configured to define a complementary relationship with the discharging electrode 6. In addition, slope portions 11 corresponding to the chamfered slope portions 5 formed on the end edges of the tooth profile portion 4 of the discharging electrode 6 are formed in respective ends of the grooves 9 which are located on the bottom side of the recess portion 10. Next, the molded gear provided with a plurality of the teeth 1, each having the chamfered portion 2 formed at an end portion thereof as shown in FIG. 7 is manufactured by performing injection-molding of resin using the molding die 8 (a fourth step).

However, in such a manufacturing method of the molded gear, as shown in FIG. 9, since the molding die 8 is formed by conducting the electrical discharge-machining for forming bottomed recess in the metal member 7 using the discharging electrode 6, which has the chamfered slope portions 5 of the tooth profile portion 4 at the tip end thereof, it becomes difficult to remove machined chips and powders generated during the electrical discharge remaining at the tip end of the discharging electrode 6 as processing depth becomes deeper, so that processing speed at the tip end must be lowered. Meanwhile, at a rear end of the discharging electrode 6, since the machined chips and powders by the electrical discharge machining is smoothly removed, electrical discharge-machining can proceed; well as a result, a change in the amount of processing by the electrical discharge machining between the tip end and rear end of the discharging electrode 6 occurs and machining accuracy of the molding die 8 is likely to be degraded. Therefore, even when a molded gear having the chamfered portions 2 using such the molding die 8 is manufactured, it is impossible to obtain a product with good accuracy.

SUMMARY OF THE INVENTION

The present invention is made with a view to solving the foregoing problems, and an object of the present invention is to provide a manufacturing method of a molded gear which enables it to make a highly accurate molding die, and which eventually allows it to manufacture a sufficiently accurate molded gear provided with chamfered portions on a tooth end, by employing the molding die.

To achieve this object, according to a first aspect of the present invention, there is provided a manufacturing method of a molded gear having a plurality of teeth, each being provided with a chamfered portion shaped by providing a slope in one end edges of the tooth, wherein the manufacturing method comprises: the steps of:

performing electrical discharge-machining of a metal member having a thickness smaller than a dimension of a tooth width of the molded gear by moving a first discharging electrode that is formed to have the same shape as a cross-sectional shape taken perpendicularly to a rotation axis of the molded gear while penetrating the metal member in a direction of thickness thereof until a gear piece is formed to have a hollow portion the same in a shape thereof as the molded gear;

performing electrical discharge-machining of a different metal member only a predetermined depth in a direction of thickness of the different metal member by moving a second discharging electrode that is formed to have a shape the same as a cross-sectional shape taken perpendicularly to the rotation axis of the molded gear and also to have a chamfered slope portion the same in a shape thereof as the chamfered portion of each tooth on a tip end of the second discharging electrode until a chamfer-application piece having a recess portion the same in a shape thereof as the chamfered portions of the molded gear;

bringing the hollow portion of the gear piece and the recess portion of the chamfer-application piece to be in registration with each other and subsequently connecting the gear piece to the chamfering piece to thereby assemble a molding die; and manufacturing a molded gear by molding a gear forming material by using the assembled molding die.

According to such a configuration as described above, the electrical discharge-machining of a metal member having a thickness smaller than a dimension of a tooth width of the molded gear is performed by moving a first discharging electrode that is formed to have the same shape as a cross-sectional shape taken perpendicularly to a rotation axis of the molded gear while penetrating the metal member in a direction of thickness thereof until a gear piece is formed to have a hollow portion the same in a shape thereof as the molded gear; the electrical discharge-machining of a different metal member is performed by moving, only a predetermined depth in a direction of thickness of the different metal member, a second discharging electrode that is formed to have a shape the same as a cross-sectional shape taken perpendicularly to the rotation axis of the molded gear and also to have a chamfered slope portion the same in a shape thereof as the chamfered portion of each tooth on a tip end of the second discharging electrode until a chamfer-application piece having a recess portion the same in a shape thereof as the chamfered portions of the molded gear; the hollow portion of the gear piece and the recess portion of the chamfer-application piece are brought to be in registration with each other, so that the gear piece is connected to the chamfer-application piece to thereby assemble a molding die; and a molded gear is manufactured by molding a gear forming material by the use of the assembled molding die.

Hence, machining speed of the gear piece can be substantially the same between a start end and a terminal end in the machining of the said gear piece and machining accuracy of the gear piece can be improved. Furthermore, since machining depth is shallow and machining time is short in a processing of the chamfer-application piece, variation of the amount of processing between the start end and the terminal end in the processing is reduced and the machining accuracy of the chamfer-application piece can be improved. Therefore, the molding die is assembled by bringing the hollow portion of the gear piece to be in registration with the recess portion of the chamfer-application piece and by connecting the gear piece to the chamfer-application piece; and then the molding die can be formed with high accuracy. Thus, the molded gear provided with the chamfered portions can be accurately manufactured by molding a gear forming material by the use of the manufactured molding die.

Furthermore, according to a second aspect of the present invention, there is provided a manufacturing method of a molded gear having a plurality of teeth, each being provided with chamfered portion formed with slopes provided on one end edges of each tooth, wherein the manufacturing method comprises the steps of:

performing electrical discharge-machining of a metal member having a thickness smaller than a dimension of a tooth width of the molded gear by moving a discharging electrode that is formed to have the same shape as a cross-sectional shape taken perpendicularly to a rotation axis of the molded gear and also to have a chamfered slope portion the same in a shape thereof as the chamfered portion of each tooth on a tip end of the discharging electrode while penetrating the metal member in a direction of thickness thereof until a gear piece is formed to have a hollow portion the same in a shape thereof as the molded gear;

performing electrical discharge-machining of a different metal member only a predetermined depth in a direction of thickness of the different metal member by moving the discharging electrode until a chamfer-application piece having a recess portion the same in a shape thereof as the chamfered portions of the molded gear;

bringing the hollow portion of the gear piece and the recess portion of the chamfer-application piece to be in registration with each other and subsequently connecting the gear piece to the chamfer-application piece to thereby assemble a molding die; and manufacturing the molded gear by molding a gear forming material by using the assembled molding die.

According to such a configuration as described above, the gear piece having the hollow portion of the same shape as the molded gear is formed by performing electrical discharge-machining of a metal member until the metal member is penetrated in the direction of thickness thereof which is smaller in thickness than the tooth width dimension of the molded gear, using the discharging electrode having the same shape as cross sectional shape perpendicular to the rotation axis of the molded gear and having chamfered slope portions of the same shape as the chamfered portions of the each tooth on the tip end of the discharging electrode; the chamfer-application piece having a recess portion of the same shape as the chamfered portions of the molded gear is formed by performing electrical discharge-machining of a different metal member by only the predetermined depth in the direction of thickness thereof, by using the same discharging electrode; the molding die is assembled by bringing the hollow portion of the gear piece to be in registration with the recess portion of the chamfer-application piece and by connecting the gear piece to the chamfer-application piece; and the molded gear is manufactured by molding the gear forming material by the use of the molding die. Hence, an inner circumferential surface shape of the gear piece can conform to an inner circumferential surface shape of the chamfer-application piece, so that a more accurate molding die can be molded. Therefore, the molded gear provided with the chamfered portions can be more accurately manufactured by molding a gear forming material by the use of the high accurate molding die.

Further, it should be understood that combined value of thickness of the gear piece and processing depth of the chamfer-application piece is substantially equal to the tooth width of the molded gear. Therefore, the processing depth of the chamfer-application piece is set so that the combined value of both thickness of the gear piece and processing depth of the chamfer-application piece is substantially equal to the tooth width of the molded gear. Therefore, the tooth width of the molded gear can be formed to have dimensional requirements according to a desired design.

Then, the gear forming material is preferably comprised of resin. Therefore, the resin is subjected to injection-molding to the molding die to eventually manufacture a molded gear. Accordingly, manufacturing cost of the gear can be appreciably reduced.

BRIEF DESCRIPTION OF THE DRAWINGS

FIG. 3 is a flow chart for explaining the manufacturing method of the molded gear according to the present invention;

FIG. 4A is a sectional view showing a state where electrical discharge-machining is performed in a direction of thickness with respect to a metal member using a first discharging electrode, and FIG. 4B is a sectional view taken along the line X-X shown in FIG. 4A;

FIG. 5A is a sectional view showing a state where electrical discharge-machining is performed in a direction of thickness with respect to other metal member using a second discharging electrode, and FIG. 5B is a sectional view taken along the line Y-Y shown in FIG. 5A;

FIG. 8A is a front view showing a discharging electrode member, and FIG. 8B is a front view showing the discharging electrode.

DESCRIPTION OF PREFERRED
EMBODIMENTS OF THE INVENTION

Embodiments of the present invention will be described below with reference to the accompanying drawings.

Figure 1:
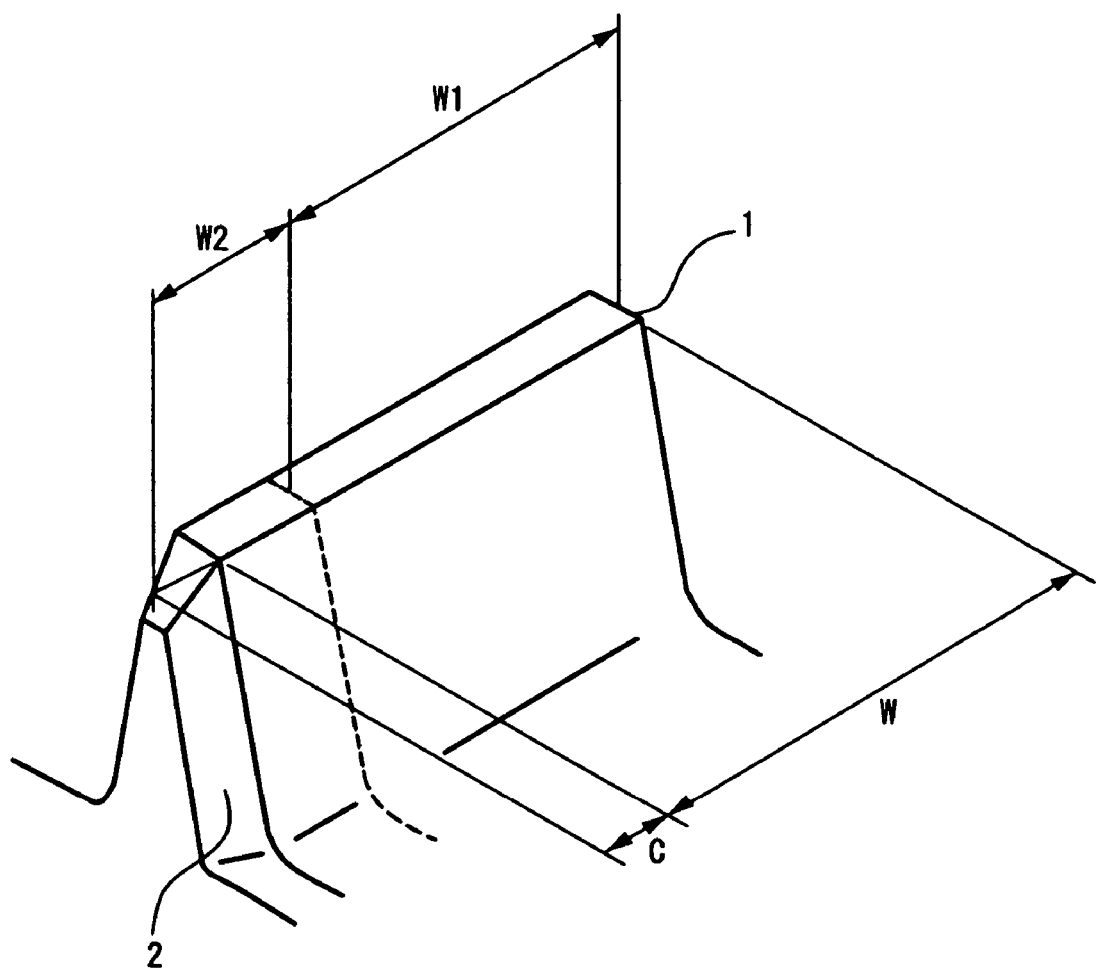
FIG. 1 is a perspective view showing a tooth profile of the tooth of a molded gear in which chamfered portions are formed using a manufacturing method of a molded gear according to the present invention.
Figure 2:
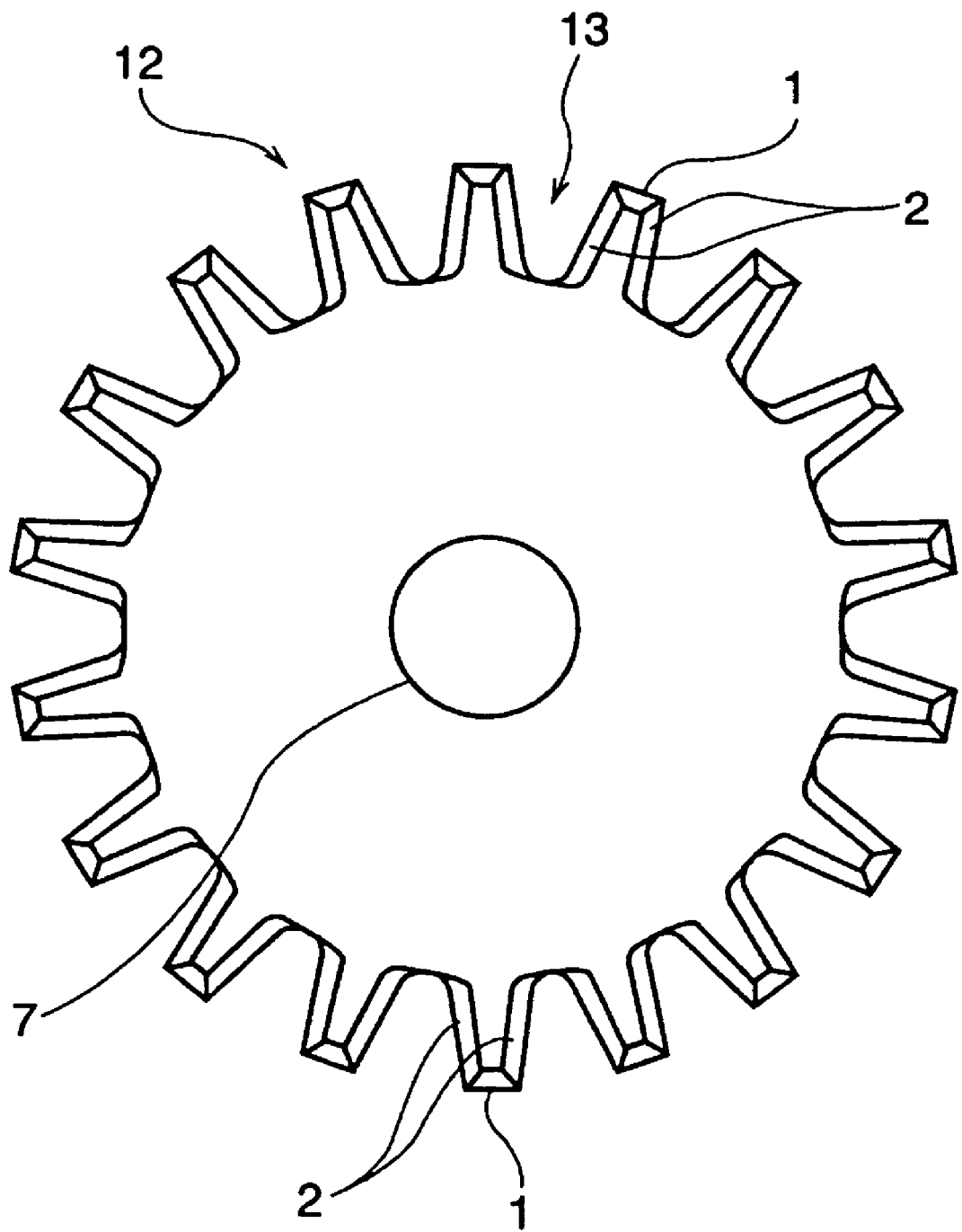
FIG. 2 is a front view showing shape of the molded gear provided with a plurality of the teeth shown in FIG. 1.

FIG. 1 is a perspective view showing a tooth profile of a tooth 1 of a molded gear which is formed with a manufacturing method of a molded gear according to the present invention; and FIG. 2 is a front view showing a molded gear 12 provided with a plurality of the teeth 1 shown in FIG. 1. The molded gear 12 is formed with chamfered portions 2 with slopes provided on one end edges in a direction of the tooth width of each tooth 1 as shown in FIG. 1. The chamfered portions 2 guide the teeth 1 of one molded gear 12 to tooth grooves (refer to reference numeral 13 shown in FIG. 2) side of the other molded gear, not shown in the drawing, to be readily engaged with one another so that auto-assembly of the two molded gears is facilitated.

FIG. 3 is a flow chart for explaining a manufacturing method of a molded gear according to the present invention. This manufacturing method of the molded gear is intended to manufacture the molded gear 12 by molding resin material as a gear forming material, using a molding die 8 (refer to FIG. 6) in which a gear piece 14 (refer to FIG. 4) corresponding to a tooth width W portion of the tooth 1 shown in FIG. 1 and a chamfer-application piece 15 (refer to FIG. 5) corresponding to the chamfered portions 2 shown in FIG. 1 are separately formed and assembled. The manufacturing procedure will be described in detail below, with reference to FIG. 3.

Figure 4A:
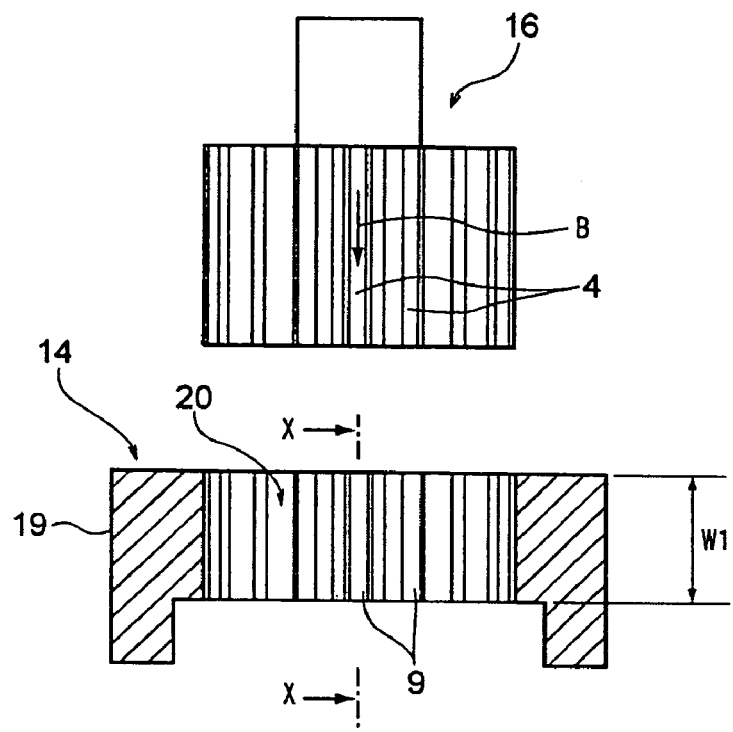
FIG. 4A and FIG. 4B are explanation views showing forming states of a gear piece of a molding die used for manufacturing the molded gear.
Figure 4B:
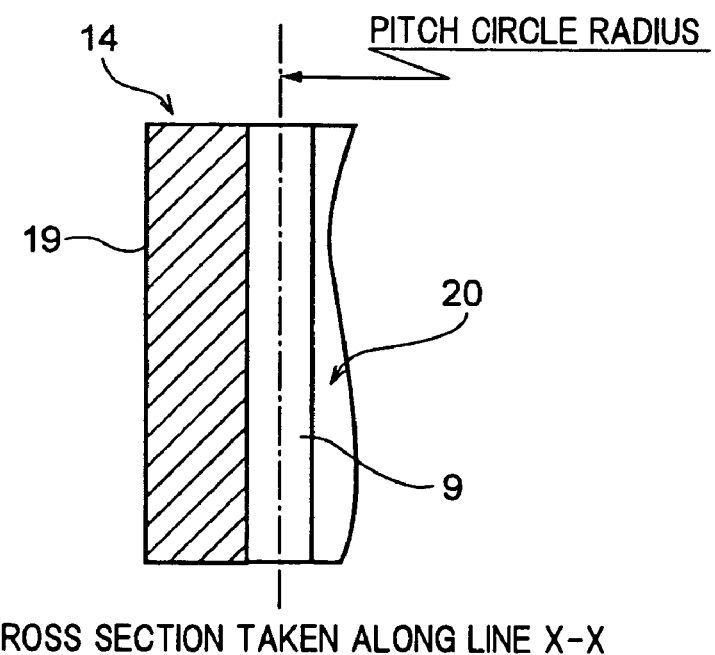

First, in step S1, a first discharging electrode 16 is produced to form a gear piece 14 shown in FIG. 4A. The first discharging electrode 16 has the same shape as a cross-sectional shape taken perpendicularly to a rotation axis 7 of the molded gear 12 shown in FIG. 2 and is provided with a plurality of tooth profile portions 4 of the same shape as the tooth profile of the tooth 1 as shown in FIG. 1 on the circumferential surface thereof. Then, the producing of the discharging electrode 16 is achieved by the employment of the known art of technology.

Figure 5A:
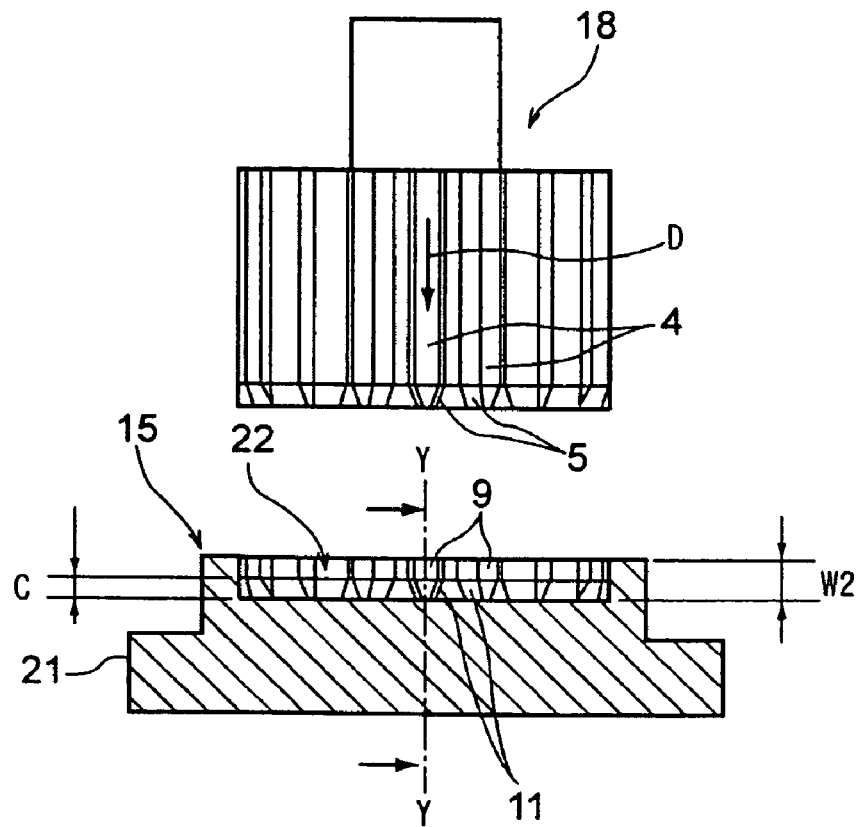
FIG. 5A and FIG. 5B are explanation views showing forming states of a chamfer-application piece of the molding die which is used for manufacturing the molded gear.
Figure 5B:
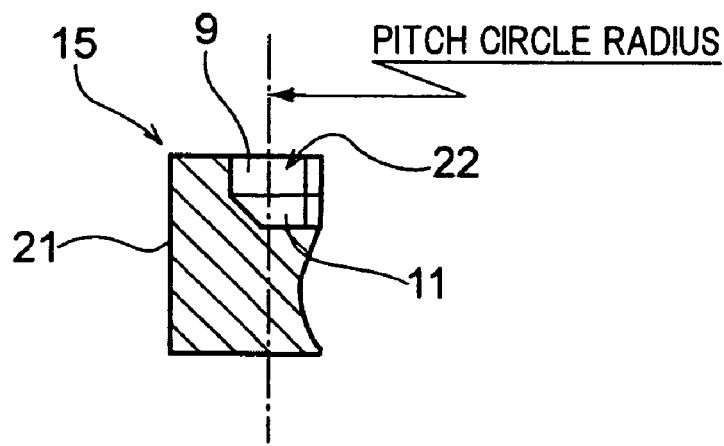

In step S2, a second discharging electrode 18 is produced to form the chamfer-application piece 15 as shown in FIG. 5A. The second discharging electrode 18 has the same shape as a cross-sectional shape taken perpendicularly to the rotation axis 7 of the molded gear 12 shown in FIG. 2, the chamfered slope portions 5 of the same shape as the chamfered portions 2 of each tooth 1 on a tip end of the second discharging electrode, and a plurality of the tooth profile portions 4 of the same shape as the tooth 1 as shown in FIG. 1 on the circumferential surface thereof. In addition, the second discharging electrode 18 may be provided as one of the two first discharging electrodes 16 which is additionally formed with the chamfered slope portions 5 by cutting the end edges of the tooth profile portion 4 thereof by the use of a cutting tool, such as a rotating end mil.

In step S3, as shown in FIG. 4A, the gear piece 14 having a hollow portion 20 of the same shape as the molded gear 12 is formed with the first discharging electrode 16 by performing electrical discharge-machining until the electrode 16 penetrates into a metal member 19 with a thickness W1 smaller than a tooth width W (refer to FIG. 1) of the tooth 1 of the molded gear 12 in a direction of the thickness thereof (direction of an arrow B shown in the same figure). Thus, grooves 9 are formed in response to the tooth profile portions 4 of the first discharging electrode 16 on the inner circumferential surface of the hollow portion 20 of the metal member 19, as shown in a cross-section taken along the line X-X shown in FIG. 4B. In this case, the amount of processing at any part of the hollow portion 20 can be constant by means that processing speed between a start end and a terminal end in a processing is set substantially the same.

In step S4, as shown in FIG. 5A, the chamfer-application piece 15 having a recess portion 22 of the same shape as the chamfered portion 2 of the tooth 1 of the molded gear 12 by performing electrical discharge-machining by only a predetermined depth W2 in a direction of thickness thereof (direction of an arrow D shown in the same figure) with respect to a different metal member 21, is formed using the second discharging electrode 18. Hence, the grooves 9 are formed in response to the tooth profile portions 4 of the second discharging electrode 18 on the inner circumferential surface of the recess portion 22 of the different metal member 21, as shown in a cross-section taken along the line Y-Y shown in FIG. 5B. Furthermore, the slope portions 11 corresponding to the chamfered slope portions 5 provided on the end edges of the tooth profile portion 4 of the second discharging electrode 18 are formed on the bottom of the grooves 9. Here, the machining depth W2 of the recess portion 22 is formed such that the following equation holds when the amount of chamfering is C, as shown in FIG. 1.

$$W1+W2-C=W$$

In addition, the following equation may hold when the amount of chamfering C is sufficiently small with respect to the tooth width W.

$$W1+W2=W$$

Figure 6:
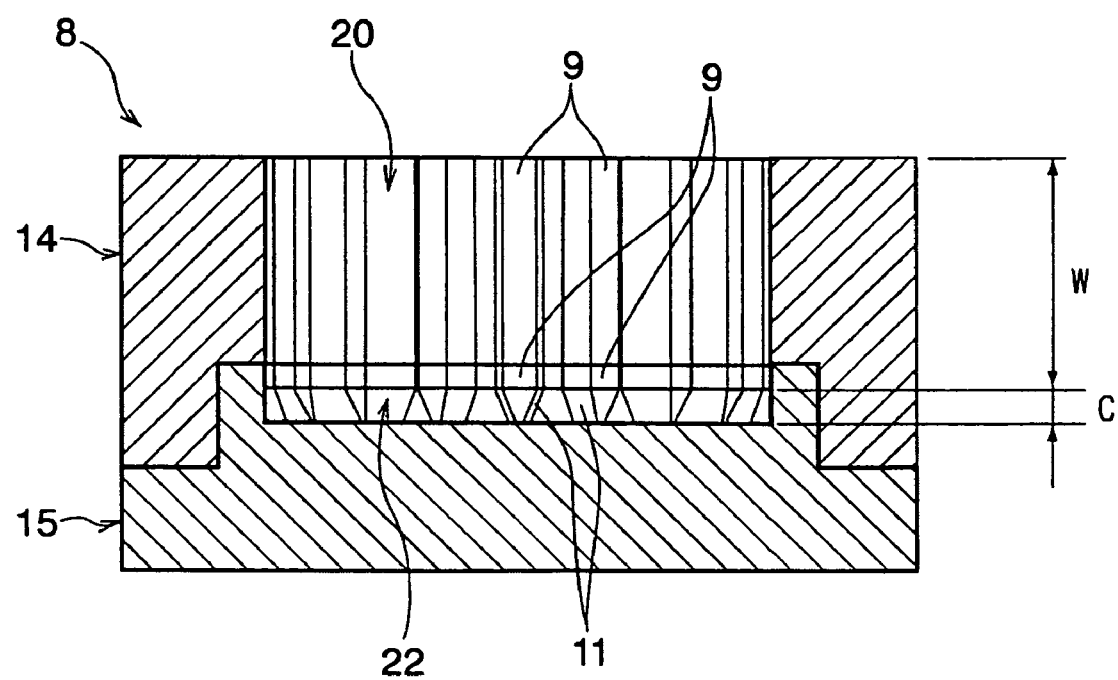
FIG. 6 is a sectional view showing the molding die formed by combining the gear piece and the chamfer-application piece.
Figure 7:
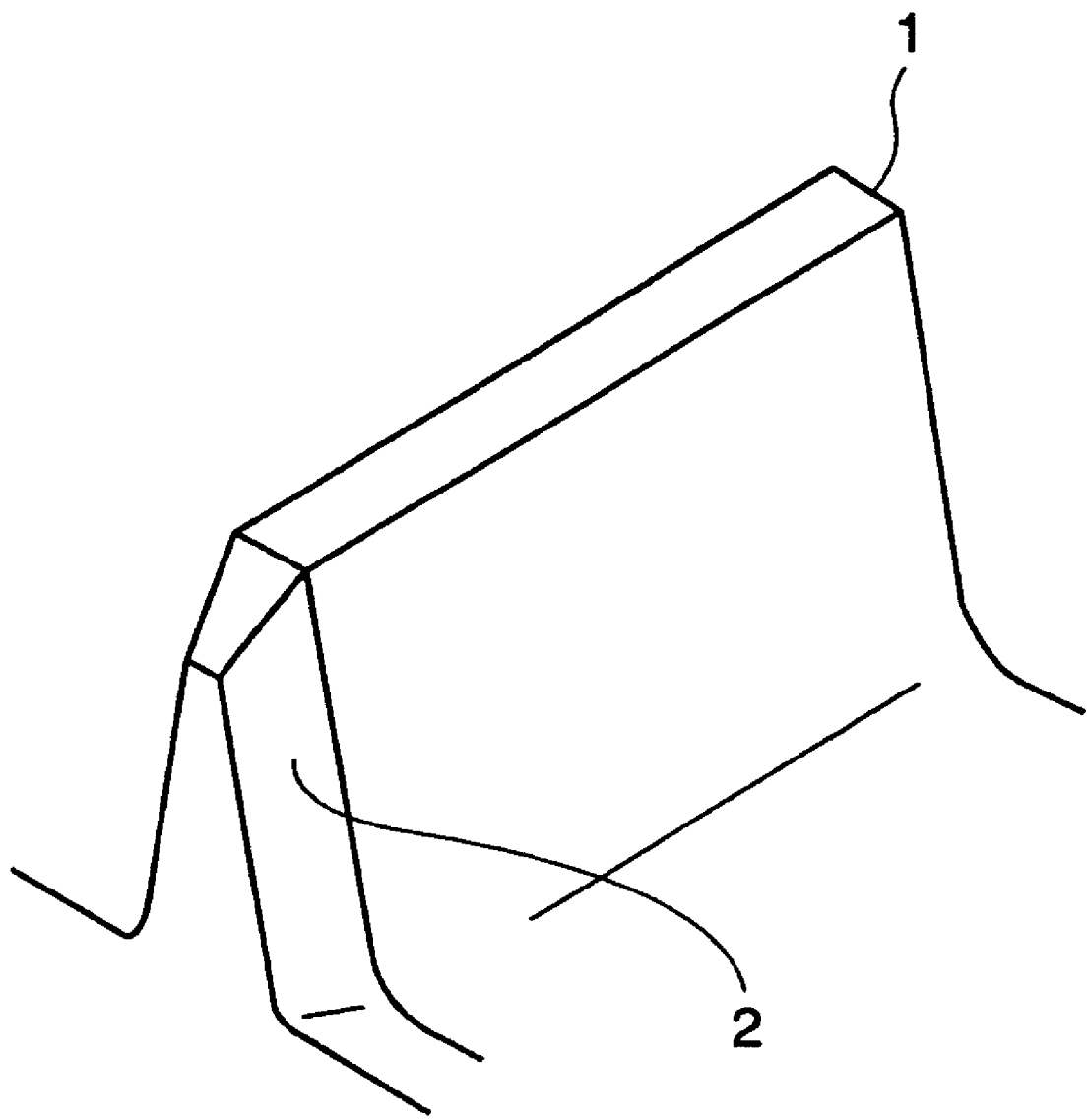
FIG. 7 is a perspective view showing a tooth profile of the tooth provided with chamfered portions of a molded gear manufactured with a conventional manufacturing method.
Figure 8A:
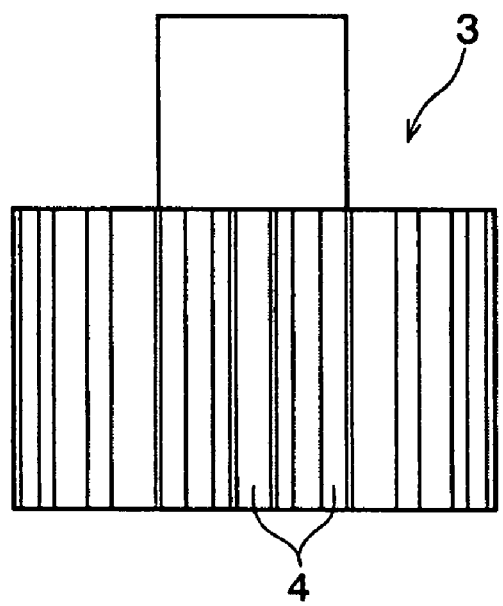
FIG. 8A and FIG. 8B are explanation views showing a discharging electrode for use in the conventional manufacturing method.
Figure 8B:
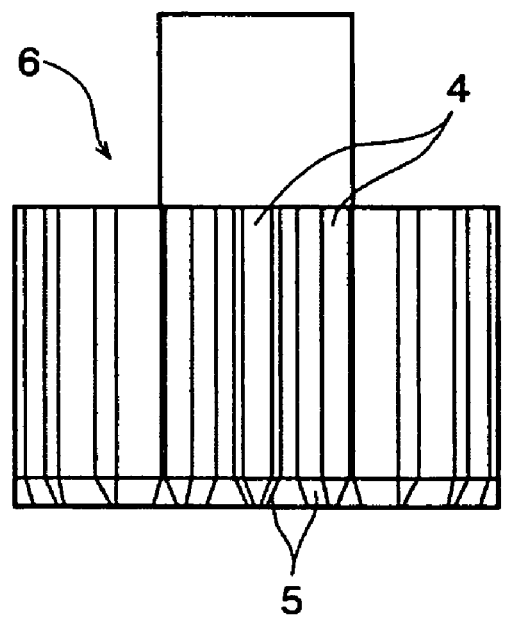
Figure 9:
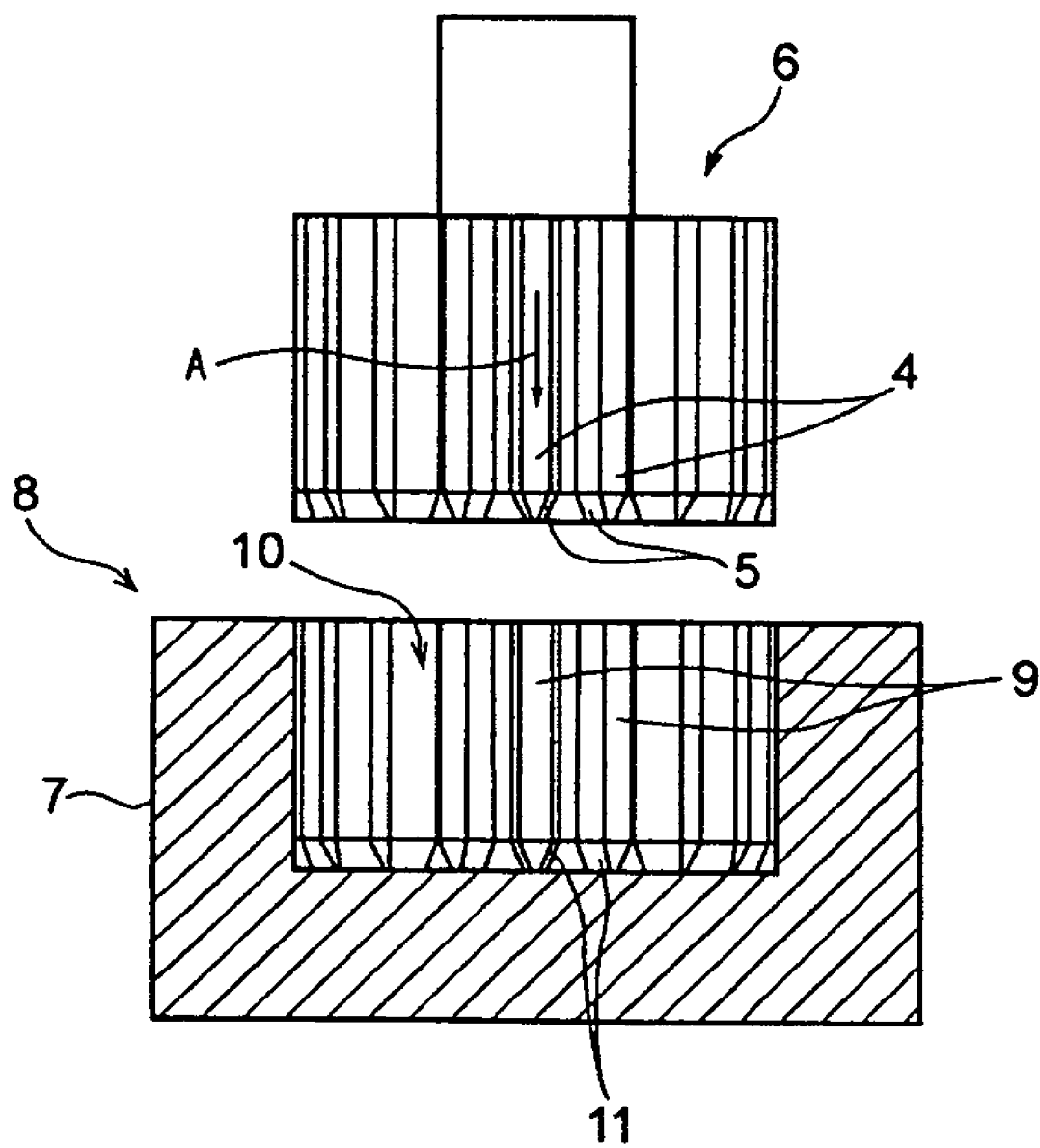
FIG. 9 is a cross-sectional view showing a molding die, which is formed by using the discharging electrode shown in FIG. 8.

In step S5, as shown in FIG. 6, the molding die 8 is assembled by connecting the hollow portion 20 of the gear piece 14 to the recess portion 22 of the chamfer-application piece 15 so that the respective grooves 9 are brought to be in registration with one another. In this case, for example, the gear piece 14 and the chamfer-application piece 15 are processed together to form a pin hole and if a pin is knocked to the pin hole to connect both the pieces, both the pieces can be assembled while being highly accurately positioned.

Then, in step S6, if, for example, resin is injection-molded as a gear member to the molding die 8, the molded gear 12, as shown in FIG. 2, provided with plurality of teeth 1 on which the chamfered portions 2 are formed with slopes which is provided on one end edges in a direction of the tooth width as shown in FIG. 1, can be manufactured.

In addition, although the case where the gear piece 14 and the chamfer-application piece 15 are formed using different discharging electrodes 16 and 18 is described above, it should not be limited to this case, thus the gear piece 14 and the chamfer-application piece 15 may be formed using the same discharging electrode. The discharging electrode used in this case is the second discharging electrode 18 having the same shape as a cross-sectional shape taken perpendicularly to the rotation axis 7 of the molded gear 12 and the chamfered slope portions 5 of the same shape as the chamfered portions 2 of each tooth 1 on a tip end of the second discharging electrode. Thereby, the shape of the hollow portion 20 of the gear piece 14 coincides with that of the recess portion 22 of the chamfer-application piece 15 and therefore a more highly accurate molding die 8 can be formed.

Furthermore, the chamfered portion 2 may not be a slope, but rounded. Further, the molded gear 12 is not limited to a resin-made gear member that is injection-molded; however, one which is made of sintered material may be molded.

Furthermore, though slight, streaky steps appear on portions corresponding to the connection portions between the gear piece 14 and the chamfer-application piece 15 on each tooth 1 of the molded gear 12 obtained by injection-molding.

The contents of the Japanese Patent Application No. 2005-084404, filed on Mar. 23, 2005, that forms a basis for claiming the priority is incorporated herein as a part of the present application by reference.

We claim:

1. A manufacturing method of a molded gear having a plurality of teeth, each being provided with a chamfered portion shaped by providing a slope in one end edges of the tooth, wherein the manufacturing method comprises: the steps of:
performing electrical discharge-machining of a metal member having a thickness smaller than a dimension of a tooth width of the molded gear by moving a first discharging electrode that is formed to have the same shape as a cross-sectional shape taken perpendicularly to a rotation axis of the molded gear while penetrating the metal member in a direction of thickness thereof until a gear piece is formed to have a hollow portion the same in a shape thereof as the molded gear;
performing electrical discharge-machining of a different metal member only a predetermined depth in a direction of thickness of the different metal member by moving a second discharging electrode that is formed to have a shape the same as a cross-sectional shape taken perpendicularly to the rotation axis of the molded gear and also to have a chamfered slope portion the same in a shape thereof as the chamfered portion of each tooth on a tip end of the second discharging electrode until a chamfer-application piece having a recess portion the same in a shape thereof as the chamfered portions of the molded gear;
bringing the hollow portion of the gear piece and the recess portion of the chamfer-application piece to be in registration with each other and subsequently connecting the gear piece to the chamfering piece to thereby assemble a molding die; and
manufacturing a molded gear by molding a gear forming material by using the assembled molding die.

2. The manufacturing method for the molded gear according to claim 1, wherein a combined value of thickness of said gear piece and processing depth of said chamfer-application piece is substantially equal to the tooth width of said gear.

3. The manufacturing method for the molded gear according to claim 2, wherein said gear forming material comprises resin.

4. The manufacturing method for the molded gear according to claim 1, wherein said gear forming material comprises resin.

5. A manufacturing method of a molded gear having a plurality of teeth, each being provided with chamfered portion formed with slopes provided on one end edges of each tooth, wherein the manufacturing method comprises the steps of:
performing electrical discharge-machining of a metal member having a thickness smaller than a dimension of a tooth width of the molded gear by moving a discharging electrode that is formed to have the same shape as a cross-sectional shape taken perpendicularly to a rotation axis of the molded gear and also to have a chamfered slope portion the same in a shape thereof as the chamfered portion of each tooth on a tip end of the discharging electrode while penetrating the metal member in a direction of thickness thereof until a gear piece is formed to have a hollow portion the same in a shape thereof as the molded gear;
performing electrical discharge-machining of a different metal member only a predetermined depth in a direction of thickness of the different metal member by moving the discharging electrode until a chamfer-application piece having a recess portion the same in a shape thereof as the chamfered portions of the molded gear;
bringing the hollow portion of the gear piece and the recess portion of the chamfer-application piece to be in registration with each other and subsequently connecting the gear piece to the chamfer-application piece to thereby assemble a molding die; and
manufacturing the molded gear by molding a gear forming material by using the assembled molding die.

6. The manufacturing method for the molded gear according to claim 5, wherein a combined value of thickness of said gear piece and processing depth of said chamfer-application piece is substantially equal to the tooth width of said gear.

7. The manufacturing method for the molded gear according to claim 5, wherein said gear forming material comprises resin.

* * * * *